United States Patent
Madhey

(10) Patent No.: US 12,101,442 B2
(45) Date of Patent: Sep. 24, 2024

(54) REAL-TIME AUDIO AND VIDEO FEEDBACK DURING CONFERENCE CALLS

(71) Applicant: Microsoft Technology Licensing, LLC, Redmond, WA (US)

(72) Inventor: Suvarna Raju Madhey, Maharashtra (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 276 days.

(21) Appl. No.: 17/694,603

(22) Filed: Mar. 14, 2022

(65) Prior Publication Data

US 2023/0291839 A1    Sep. 14, 2023

(51) Int. Cl.
*H04M 3/00*       (2024.01)
*G06F 3/04842*    (2022.01)
*G06F 3/14*       (2006.01)
*H04M 3/56*       (2006.01)

(52) U.S. Cl.
CPC ........ *H04M 3/568* (2013.01); *G06F 3/04842* (2013.01); *G06F 3/1454* (2013.01)

(58) Field of Classification Search
CPC ... H04M 3/568; G06F 3/04842; G06F 3/1454
See application file for complete search history.

(56) References Cited

U.S. PATENT DOCUMENTS

| 7,881,448 | B2 | 2/2011  | Boss et al.    |
| 8,036,375 | B2 | 10/2011 | Shaffer et al. |
| 8,498,426 | B2 | 7/2013  | Bonanno        |
| 8,595,015 | B2 | 11/2013 | Lee et al.     |
| 2004/0213402 | A1 | 10/2004 | Ruetschi     |
| 2006/0023061 | A1 | 2/2006  | Vaszary et al. |

(Continued)

FOREIGN PATENT DOCUMENTS

CN    103024772 A    4/2013

OTHER PUBLICATIONS

"Preview How You Look and Sound Before A Video Call", Retrieved From: https://web.archive.org/web/20211202220227/https://support.google.com/meet/answer/10409699?hl=en, Dec. 2, 2021, 1 Page.

(Continued)

*Primary Examiner* — Rasha S Al Aubaidi
(74) *Attorney, Agent, or Firm* — Klarquist Sparkman, LLP

(57) ABSTRACT

Techniques are described for providing real-time audio and/or video feedback during a conference call. Audio feedback can be provided during a conference call in response to a participant unmuting the participant's microphone. For example, a feedback period can be initiated upon receiving an unmute indication. During the feedback period, the participant's microphone audio can be sent, in real-time, back to the participant for playback in addition to sending to the other participants. After the feedback period is over, the participant can be removed from receiving their microphone audio. Video feedback can be provided during a conference call in response to screen sharing. For example, during a feedback period, the participant can receive, in real-time, a screen content thumbnail of their shared screen content. After the feedback period is over, the screen content thumbnail can stop being sent.

20 Claims, 8 Drawing Sheets

(56) References Cited

U.S. PATENT DOCUMENTS

2017/0134447 A1   5/2017  Duschl et al.
2021/0400142 A1*  12/2021 Jorasch .............. H04L 65/1069

OTHER PUBLICATIONS

"Testing Audio Before Zoom Meetings", Retrieved From: https://support.zoom.us/hc/en-us/articles/201362283-Testing-audio-before-Zoom-Meetings, Dec. 22, 2021, 4 Pages.

International Search Report and Written Opinion dated Mar. 23, 2023, from International Patent Application No. PCT/US2022/053293, 11 pp.

* cited by examiner

REAL-TIME AUDIO AND VIDEO FEEDBACK DURING CONFERENCE CALLS

BACKGROUND

There are a number of questions that are frequently heard during a conference call. One type of question is where a participant asks, "can you hear me?" This often occurs when the participant has unmuted the participant's microphone and has begun speaking, and the participant wants to confirm that the other participants on the call can hear the participant speaking. Another type of question is where a participant asks, "can you see my screen?" This often occurs when the participant has initiated screen sharing and wants to confirm that the other participants on the conference call can see the participant's shared screen. Another type of question is where a participant states, "Sorry, I did not realize that my microphone was on." This often occurs where the participant has accidentally unmuted their microphone.

While such questions may be helpful when the participant is trying to confirm that the participant's audio is being heard, or the participant's screen is being seen, they can also be disruptive to the conference call experience. For example, having to ask whether the participant can be heard by the audience takes time, interrupts the conversation, and can generally disrupt the conference call.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for providing real-time feedback during a conference call. The operations can comprise receiving, from a client device, an indication that a participant of the conference call has unmuted the participant's microphone, where the conference call includes the participant and one or more other participants. The operations can further comprise receiving incoming audio from the participant's microphone. The operations can further comprise, during a feedback period triggered by the indication that the participant's microphone has been unmuted, sending the received incoming audio, in real-time as it is being received, to the client device for playback to the participant and to one or more other client devices associated with the one or more other participants for playback. The operations can further comprise, when the feedback period ends, sending the received incoming audio, in real-time as it is being received, to the one or more other client devices associated with the one or more other participants for playback, where the received incoming audio from the participant's microphone is not sent to the computing device for playback to the participant after the feedback period ends.

As another example, operations for providing real-time feedback during a conference call can comprise receiving, from a client device, an indication that a microphone associated with a participant of the conference call has been unmuted, where the conference call includes the participant and one or more other participants. The operations can further comprise, during a feedback period that begins when receiving the indication and upon receiving incoming audio from the participant's microphone, sending the received incoming audio, in real-time as it is being received, to the client device for playback to the participant and to one or more other client devices associated with the one or more other participants for playback. The operations can further comprise, when the feedback period ends, sending the received incoming audio, in real-time as it is being received, to the one or more other client devices associated with the one or more other participants for playback, where the received incoming audio from the participant's microphone is not sent to the computing device for playback to the participant after the feedback period ends.

As another example, operations for providing real-time feedback during a conference call can comprise receiving, from a client device, an indication that screen sharing has been initiated by a participant of the conference call, where the conference call includes the participant and one or more other participants. The operations can further comprise, during a feedback period that begins when receiving the indication and upon receiving shared screen content from the client device, generating, in real-time, a screen content thumbnail of the received shared screen content. The operations can further comprise, during the feedback period, sending the screen content thumbnail, in real-time as it is being generated, to the client device for display to the participant. The operations can further comprise, during the feedback period, sending the received shared screen content, in real-time as it is being received, to one or more other client devices associated with the one or more other participants for display. The operations can further comprise, when the feedback period ends, sending the received shared screen content, in real-time as it is being received, to the one or more other client devices associated with the one or more other participants for display, where the screen content thumbnail is not generated or sent to the computing device for display to the participant after the feedback period ends.

DETAILED DESCRIPTION

Overview

Figure 1:
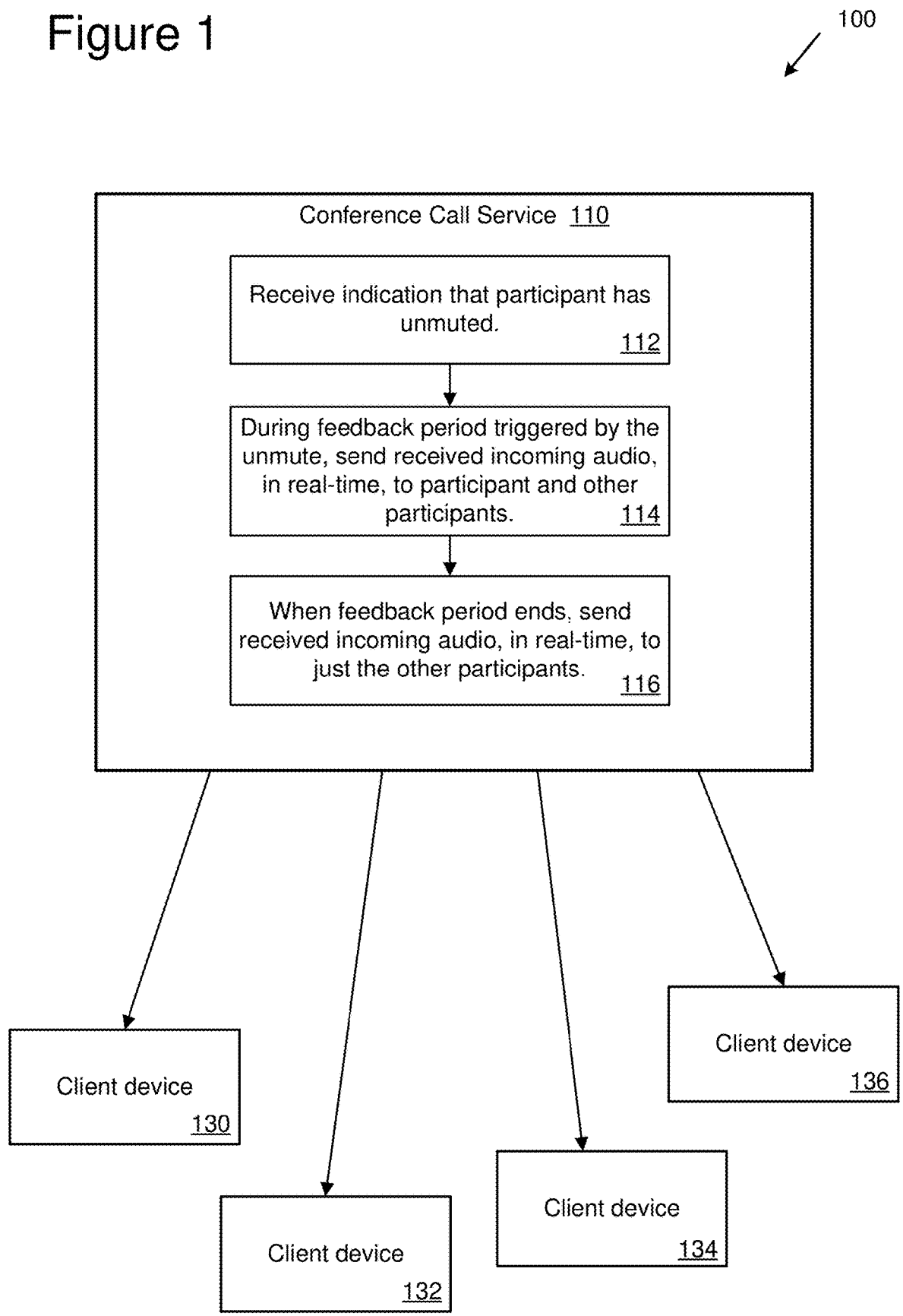
FIG. 1 is a diagram depicting an example conference call service for automatically providing real-time audio feedback during a feedback period.

The following description is directed to technologies for providing real-time audio and/or video feedback during a conference call. Audio feedback can be provided during a conference call in response to a participant unmuting the participant's microphone. For example, an indication can be received that a participant's microphone has been unmuted. In response, during a feedback period, incoming audio that is received from the participant's microphone can be sent, in real-time, to the participant's computing device for playback to the participant and to the other computing devices (and associated other participants) that are part of the conference call. Once the feedback period ends, the participant is removed from receiving the incoming audio.

Video feedback can be provided during a conference call in response to receiving an indication that screen sharing has been initiated by a participant of the conference call. For example, an indication can be received that a participant has initiated screen sharing. In response, during a feedback period, a screen content thumbnail can be generated from shared screen content and sent, in real-time, to the participant's client device for display to the participant. In addition, the shared screen content can be sent, in real-time, to the other participants of the conference call for display. Once the feedback period ends, the screen content thumbnail is no longer generated or sent to the participant's client device for display.

During a conference call, it may be difficult for a participant to know whether others on the call can hear them. For example, it may be common that the participant unmutes his or her microphone and asks, "are you able to hear me?" Having to ask others on the call if they can hear the person takes time and can disrupt the call. Similarly, if the participant just starts speaking after unmuting, the participant will not know what others are hearing (e.g., whether they are hearing the participant's voice or the volume of the participant's voice). If there is a problem with the participant's microphone, audio settings, or other issues, it may be some time before the participant is aware of the problem. Each of these issues can cause disruption to the conference call.

During a conference call, it may also be difficult for a participant to know whether others on the call can see their shared screen. For example, it may be common that the participant shares his or her screen and asks, "can you see my screen?" Having to ask others on the call if they can see the shared screen takes time and can disrupt the call. Similarly, if the participant just starts talking, the participant will not know what others are seeing. If there is a problem with the participant's screen share settings, or other issues, it may be some time before the participant is aware of the problem. Each of these issues can cause disruption to the conference call.

The technologies described herein provide solutions to the problem of the participant unmuting their microphone and not knowing whether others on the conference call can hear their voice. In some solutions, when the participant unmutes, the participant's microphone audio is directed back to the participant for playback for a period of time (also referred to as a feedback period) after the unmute occurs. Using this technology provides advantages. For example, the participant hears the participant's microphone audio in real-time (e.g., as the participant is speaking) and as it is heard by the other participants, allowing the participant to confirm that their microphone audio is working and being received by the other participants. In addition, because the microphone audio playback to the participant ends after the feedback period, the participant is not distracted once the feedback period is over.

There are distinctions and advantages between the technologies described herein and prior solutions. One example distinction is that the participant's microphone audio is provided back to the participant for playback in real-time (e.g., it is not recorded for some interval and then provided for playback after the interval is over). An advantage to this solution is that the participant hears their microphone audio in real-time as they are speaking, and knows right away, upon unmuting, if their microphone is working and that their microphone audio is being provided to the other participants of the conference call.

Another example distinction and advantage is that the participant's microphone audio is automatically sent back to the participant for playback and without any manual intervention by the participant (e.g., the participant does not manually record the microphone audio). An advantage to this technology is that it takes less time and fewer user interface actions on the part of the participant because it is triggered by unmuting of the participant's microphone.

Another example distinction and advantage is that the participant's microphone audio is sent back to the participant (more specifically to the participant's computing device for playback to the participant) by the conference call service. An advantage to this technology is that the conference call service is sending the same microphone audio to all participants (including back to the participant from which the microphone audio was received) so that all participants will hear the same audio. Therefore, the participant that is speaking will receive the same audio that the other participants receive (e.g., and can hear themselves in the same way as the other participants). This solution also provides advantages over local playback techniques where the participant's microphone audio is played back locally (without being sent to, and received by, the conference call service) because with local playback the participant will not know whether the other participants can hear the participant's microphone audio (only that the participant's microphone is working locally, which does not confirm that the participant's microphone audio is being sent to, and received by, the conference call service, or that is being sent, by the conference call service, to the other participants).

The technologies described herein provide solutions to the problem of the participant sharing their screen and not knowing whether others on the conference call can see their shared screen content. In some solutions, when the participant initiates screen sharing, the conference call service generates a screen content thumbnail (in real-time as shared screen content is being received) and sends the screen content thumbnail back to the participant for display. Using this technology provides advantages. For example, the participant sees a screen content thumbnail representing their shared screen content in real-time as their shared screen content is being sent to, and seen by, the other participants, thus allowing the participant to confirm that their screen sharing is working and being received by the other participants. In addition, because the screen content thumbnail ends after the feedback period, the participant is not distracted once the feedback period is over.

There are distinctions and advantages between the technologies described herein and prior solutions. One example distinction is that the participant's shared screen content is provided back to the participant for display, as a screen content thumbnail, in real-time. An advantage to this solution is that the participant sees their shared screen content in real-time as they are presenting, and knows right away if their screen sharing is working and being sent to the other participants of the conference call.

Another example distinction and advantage is that the screen content thumbnail is automatically sent back to the participant for display and without any manual intervention by the participant. An advantage to this technology is that it takes less time and fewer user interface actions on the part of the participant because it is triggered by initiating screen sharing.

Another example distinction and advantage is that the screen content thumbnail is generated and sent back to the participant's computing device for display by the conference call service. An advantage to this technology is that the conference call service is generating the screen content thumbnail from the same shared screen content that is being sent to the other participants, so the participant will be able to see and confirm what the other participants are receiving.

Terminology

The term "conference call" refers to a call or meeting involving two or more computing devices (e.g., desktop computers, laptop computers, tablets, smart phones, etc.). Each computing device is associated with a participant (a user) of the conference call. A conference call is managed by a conference call service (e.g., software and/or hardware resources that communicate with the participants' client devices, perform audio and/or video mixing, and perform other conference call operations).

The term "unmute" refers to a participant's microphone being unmuted. For example, the participant can perform some action to unmute the participant's microphone (e.g., click on an unmute button in a graphical user interface of a client application).

The term "screen sharing" refers to a participant of a conference call that has shared their computer desktop or a portion of their computer desktop. For example, the participant of a conference call can select a user interface element (e.g., a "share" button or icon) to initiate sharing of their desktop, a window within their desktop, or another portion of their desktop.

Example Audio and Video Feedback During Conference Calls

In the technologies described herein, audio feedback is provided during conference calls in response to a participant of the conference call unmuting their microphone. During a feedback period after the microphone has been unmuted, the participants microphone output is sent back to the participant for playback (in addition to being sent to the other participants of the conference call). When the feedback period ends, the participant's microphone output is no longer sent back to the participant.

FIG. 1 is a diagram depicting an example environment 100 that includes a conference call service 110 for automatically providing real-time audio feedback during a feedback period. The conference call service 110 is implemented using software and/or hardware resources (e.g., computer servers, cloud computing resources, software resources, etc.).

The conference call service 110 manages conference calls for various clients of the service, such as client devices 130, 132, 134, and 136. Each of the client devices (including client devices 130, 132, 134, and 136) is associated with a participant (a user). For example, each client device can run client conference call software (e.g., a client conference call app or application) that allows the user of the client device to participate in conference calls managed by the conference call service 110. In general, the conference call service 110 can manage conference calls for any number of client devices and associated participants. The conference call service 110 communicates with the client devices via computer networks (e.g., comprising the Internet).

As depicted in FIG. 1, the conference call service 110 performs a number of operations for providing real-time feedback during conference calls. In one example scenario, the conference call service first receives an indication that a participant has unmuted the participant's microphone, as depicted at 112. Next, during a feedback period (e.g., a number of seconds) that is triggered by the indication that the participant's microphone has been unmuted, the conference call service 110 sends, in real-time, incoming audio from the participant's microphone to each of the participants of the conference call (including the participant whose microphone audio is being received), as depicted at 114. When the feedback period ends, the conference call service 110 sends, in real-time, incoming audio received from the participant's microphone to the other participants of the conference call, and not to the participant whose microphone audio is being received, as depicted at 116. The conference call service 110 can perform these operations whenever a microphone of one of the participants of the conference call has been unmuted.

To illustrate these operations, consider an example scenario in which the conference call has four participants, associated with corresponding client devices 130, 132, 134, and 136. The participant associated with client device 130 has unmuted their microphone and has begun speaking. An indication of the unmute action performed at client device 130 is sent to, and received by, conference call service 110.

Continuing with the example scenario, when the conference call service 110 receives the indication of the unmute performed by the participant of client device 130, a feedback period is triggered. The feedback period can be a relatively short time period (e.g., 5-10 seconds) beginning when the participant's microphone is unmuted and during which the participant will hear their own microphone output audio in the same manner as the other participants. Specifically, in this example scenario, the conference call service 110 will send the same microphone audio received from client device 130 to each of the participants of the conference call (to participants of client devices 130, 132, 134, and 136). The conference call service 110 sends the microphone audio received from client device 130 to all of the participants in real-time as the microphone audio is received form client device 130. In this way, client device 130 will receive its microphone audio back from the conference call service 110 for playback to the participant in real-time as the participant is speaking.

Continuing with the example scenario, when the feedback period ends (e.g., after the initial 5-10 seconds after the participant's microphone has been unmuted), the conference call service 110 stops sending the microphone audio received from client device 130 back to client device 130. The conference call service 110 still sends the microphone audio received from client device 130 to the other participants of the conference call (to client device 132, 134, and 136). In this way, after the feedback period is over, the participant of client device 130 will no longer hear their own microphone audio while they are speaking.

In some implementations, the conference call service 110 manages the participants that are currently receiving microphone audio using an audience list. The audience list can be any type of data structure that indicates which participants are currently receiving microphone audio. Typically, when one of the participants of the conference call is speaking (also referred to as the speaker or presenter) the audience list includes all other participants of the conference call (except for the participant is speaking). Therefore, all of the other participants will hear what the presenter is saying, but the presenter's audio will not be sent back to the presenter for playback. However, according to the technologies described herein, when a participant unmutes their microphone, the conference call service 110 adds the participant to the audience list, along with the other participants of the conference call. When the conference call service 110 sends the audio received from the participant's microphone to the audience list, the participant will also receive the audio for playback. Once the feedback period ends, the conference call service 110 removes the participant from the audience list.

In some implementations, the conference call service 110 determines the audio level of the incoming audio from the participant's microphone. The conference call service 110 can then send an indication of the determined audio level to the client device, where it can be presented to the participant of the client device. For example, the determined audio level can be displayed to the participant as a graphical user interface element (e.g., a graphical slider or bar indicating an instantaneous or average audio level on a scale) or presented to the participant in another way (e.g., as an indication of whether the determined audio level is low). In some implementations, the determined audio level is only sent to the client device during the feedback period. Depending on the determined audio level presented to the participant, the participant could take some action (e.g., if the determined audio level is low, the participant could increase their microphone output).

The technologies described herein for automatically providing real-time audio feedback during a feedback period can also provide advantages when the participant accidentally or unintentionally unmutes their microphone. For example, when the accidental or unintentional unmute occurs, the participant will hear, in real-time, their own voice and/or other audio picked up by their microphone and know that they have been unmuted and other participants are hearing their microphone audio. The participant can then correct the situation (e.g., by muting their microphone).

Figure 2:
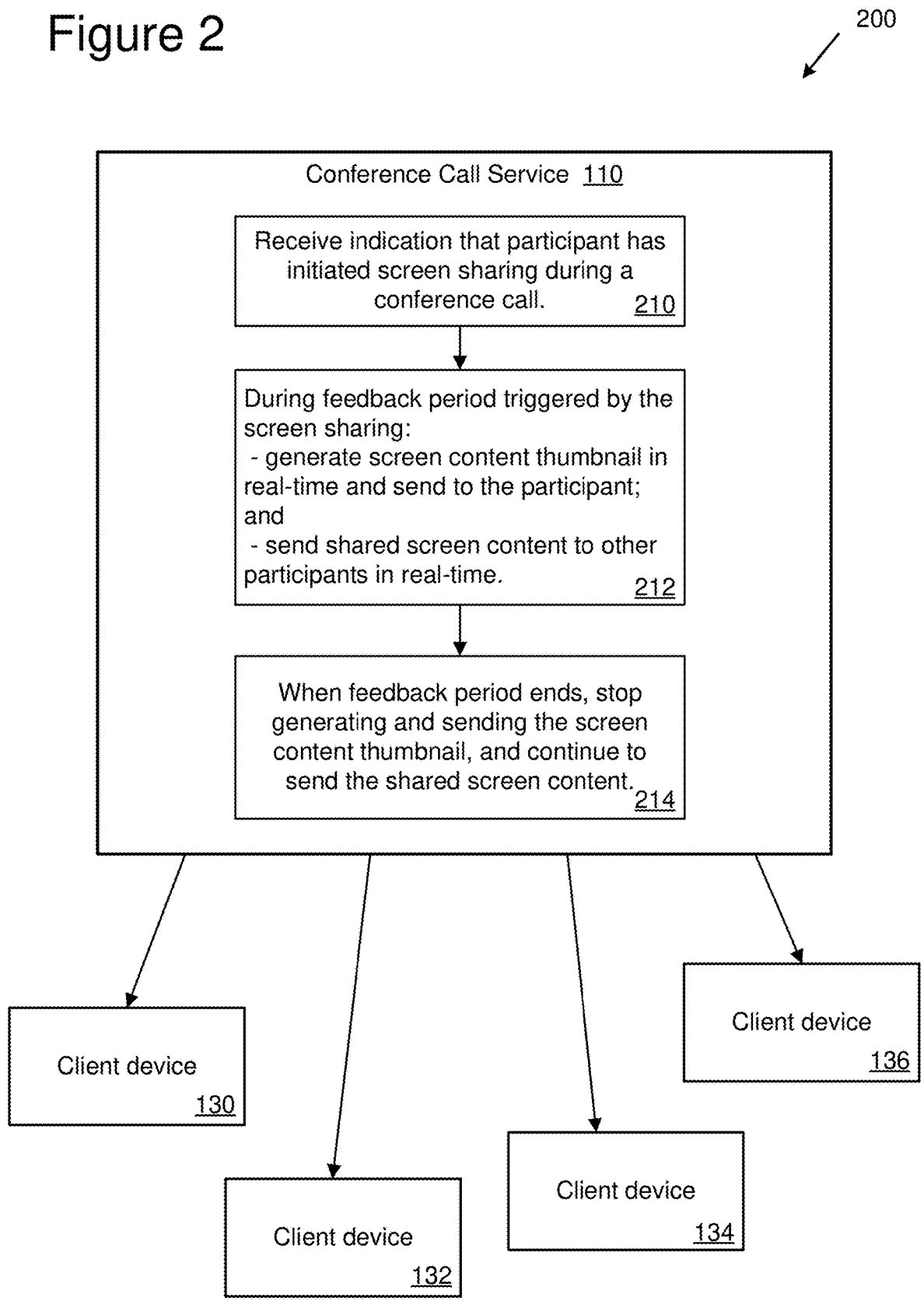
FIG. 2 is a diagram depicting an example conference call service for automatically providing real-time video during a feedback period.

FIG. 2 is a diagram depicting an example environment 200 that includes a conference call service 110 for automatically providing real-time video feedback during a feedback period. In general, the conference call service 110 is can be the same conference call service 110 described above in FIG. 1, and be capable of providing real-time audio and/or video feedback during feedback periods. However, depending on the implementation, a given conference call service can be configured for providing only real-time audio feedback or only real-time video feedback.

As depicted in FIG. 2, the conference call service 110 performs a number of operations for providing real-time feedback during conference calls. In one example scenario, the conference call service 110 first receives an indication that a participant has initiated screen sharing during a conference call, as depicted at 210. Next, during a feedback period (e.g., a number of seconds) that is triggered by the indication that the participant has initiated screen sharing (e.g., when the participant selects a share screen button to share the participant's computer screen, also referred to as a desktop, or a portion of the participant's computer screen, such as a particular window), a screen content thumbnail is generated in real-time by the conference call service 110 and sent to the participant, as depicted at 212. In addition, the shared screen content from the participant is sent by the conference call service 110 to the other participants of the conference call, as depicted at 212. When the feedback period ends, the conference call service 110 stops generating and sending the screen content thumbnail to the participant, but continues to send the shared screen content received from the participant to the other participants of the conference call. The conference call service 110 can perform these operations whenever a participant initiates screen sharing.

By sending the screen content thumbnail to the participant for display, the participant will know, in real-time, whether screen sharing is working and whether the other participants can see their shared screen content. If the participant sees the screen content thumbnail, and it depicts their shared screen content, then the participant knows that the other participants are receiving their shared screen content because the conference call service 110 is generating the screen content thumbnail from the same shared screen content it is receiving from the participant's client device and sending to the other participants for display. Furthermore, when the feedback period is over, the conference call service 110 stops generating and sending the screen content thumbnail to the participant so that the participant is not distracted after having had the chance to confirm proper screen sharing operation.

To illustrate these operations, consider an example scenario in which the conference call has four participants, associated with corresponding client devices 130, 132, 134, and 136. The participant associated with client device 132 has initiated screen sharing of at least a portion of the screen of client device 132. An indication that the participant of client device 132 has initiated screen sharing is sent to, and received by, conference call service 110.

Continuing with the example scenario, when the conference call service 110 receives the indication of the screen sharing performed by the participant of client device 132, a feedback period is triggered. The feedback period can be a relatively short time period (e.g., 5-10 seconds) beginning when the participant initiates screen sharing and during which the participant will see a screen content thumbnail that depicts their shared screen content as it is seen by the other participants. Specifically, in this example scenario, the conference call service 110 will generate a screen content thumbnail, in real-time as shared screen content is received from client device 132, and send the screen content thumbnail back to client device 132 for display. The conference call service 110 will also send the shared screen content in real-time to the other participants of the conference call (to participants of client devices 130, 134, and 136). In this way, the participant of client device 132 will receive its shared screen content, in the form of a screen content thumbnail, back from the conference call service 110 for display to the participant in real-time.

Continuing with the example scenario, when the feedback period ends (e.g., after the initial 5-10 seconds after the participant has initiated screen sharing), the conference call service 110 stops generating and sending the screen content thumbnail to client device 132. However, the conference call service 110 still sends the shared screen content to the other participants of the conference call (to client device 130, 134, and 136) while screen sharing is active. In this way, after the feedback period is over, the participant of client device 132 will no longer see the screen content thumbnail of their shared screen content.

Figure 3:
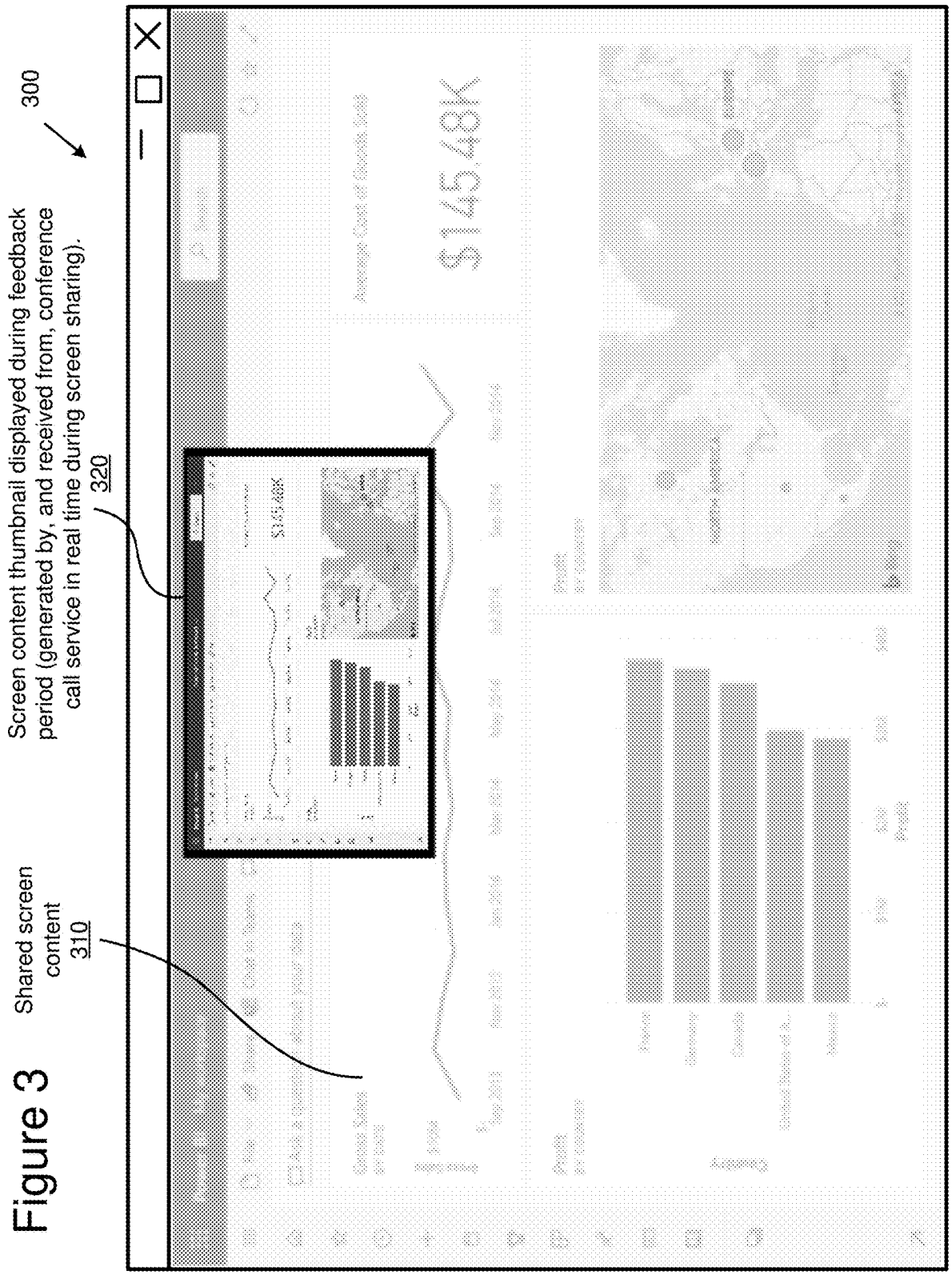
FIG. 3 is a diagram depicting an example screen content thumbnail displayed during a feedback period.

FIG. 3 is a diagram 300 depicting an example screen content thumbnail 320 displayed during a feedback period. Specifically, the diagram 300 depicts the screen (or a portion of the screen) of a client device (e.g., of client device 132 or of another client device). A participant associated with the client device has initiated screen sharing during a conference call, which has resulted in the client device sending the shared screen content 310 to the conference call service (e.g., to conference call service 110 or to another conference call service). In this example, the shared screen content 310 is a window of an application containing example text and graphical content.

When the conference call service receives the indication from the client device that screen sharing has been initiated by the participant of the conference call, a feedback period begins. During the feedback period, the conference call service generates a screen content thumbnail 320 of the shared screen content 310 received form the client device and sends the screen content thumbnail 320 to the client device for display, as illustrated by the screen content thumbnail 320 displayed at the client device. The screen content thumbnail 320 is a reduced version (e.g., reduced in dimensions, resolution, bandwidth, etc.) of the shared screen content 310 as received by the conference call service.

The conference call service generates the screen content thumbnail 320 in real-time as the shared screen content 310 is being received from the client device. In addition, the conference call service sends the shared screen content 310, in real-time, to the other participants of the conference call (specifically to the client devices associated with the other participants). Once the feedback period ends, the conference call service stops generating and sending the screen content thumbnail 320 to the client device (i.e., the screen content thumbnail 320 will stop being received and displayed at the client device after the feedback period is over). However, the conference call service will continue to send the shared screen content 310 to the other participants until screen sharing is ended by the participant.

Methods for Real-Time Feedback During Conference Calls

Figure 4:
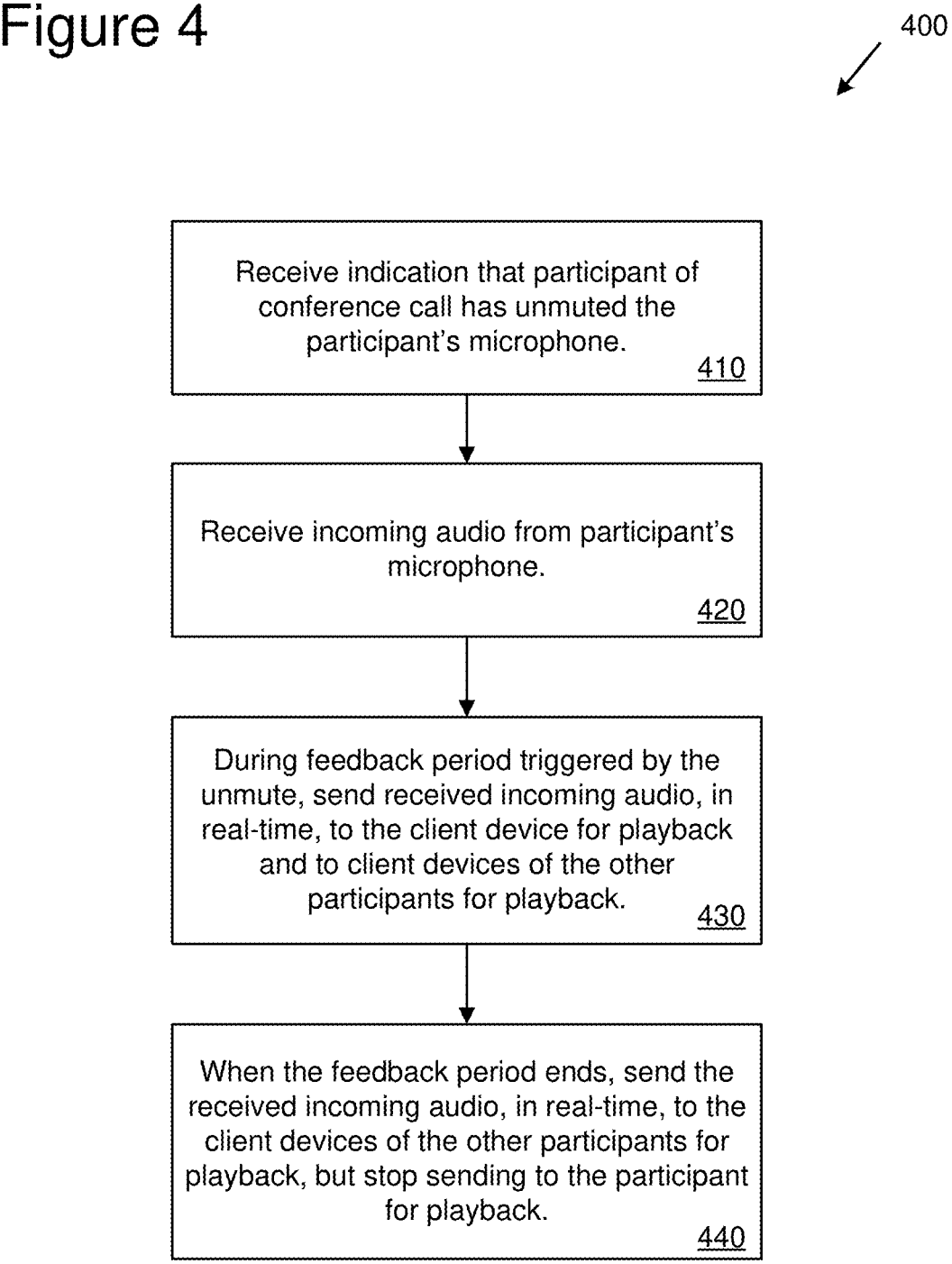
FIG. 4 is a flowchart of an example method for providing real-time feedback during a conference call when a microphone has been unmuted.

FIG. 4 is a is a flowchart of an example method 400 for providing real-time feedback during a conference call when a microphone has been unmuted. For example, the example method 400 can be performed by a conference call service, such as conference call service 110. At 410, an indication is received that a participant of the conference call has unmuted the participant's microphone. The conference call includes the participant and one or more other participants. At 420, incoming audio is received from the participant's microphone.

At 430, during a feedback period triggered by the indication that the participant's microphone has been unmuted, the received incoming audio is sent, in real time as it is being received, to the client device for playback to the participant. During the feedback period, the incoming audio is also sent, in real-time as it is being received, to one or more other client devices associated with the one or more other participants for playback.

At 440, when the feedback period ends, the received incoming audio is still sent, in real-time as it is being received, to the one or more other client devices associated with the one or more other participants for playback. However, the received incoming audio is not sent to the client device for playback to the participant after the feedback period ends.

Figure 5:
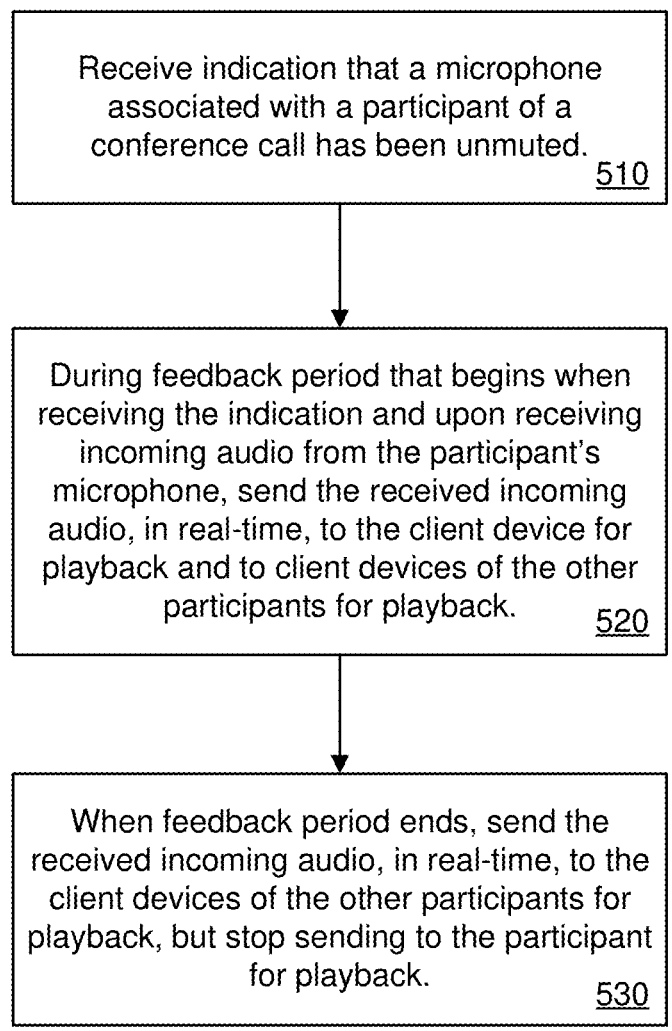
FIG. 5 is a flowchart of another example method for providing real-time feedback during a conference call when a microphone has been unmuted.

FIG. 5 is a is a flowchart of another example method 500 for providing real-time feedback during a conference call when a microphone has been unmuted. For example, the example method 500 can be performed by a conference call service, such as conference call service 110. At 510, an indication that a microphone associated with a participant of a conference call has been unmuted is received from the participant's client device. The conference call includes the participant and one or more other participants.

At 520, during a feedback period that begins when receiving the indication that the participants microphone has been unmuted and upon receiving incoming audio from the participant's microphone, the received incoming audio is sent, in real time as it is being received, to the client device for playback to the participant. During the feedback period, the incoming audio is also sent, in real-time as it is being received, to one or more other client devices associated with the one or more other participants for playback.

At 530, when the feedback period ends, the received incoming audio is still sent, in real-time as it is being received, to the one or more other client devices associated with the one or more other participants for playback. However, the received incoming audio is not sent to the client device for playback to the participant after the feedback period ends.

Figure 6:
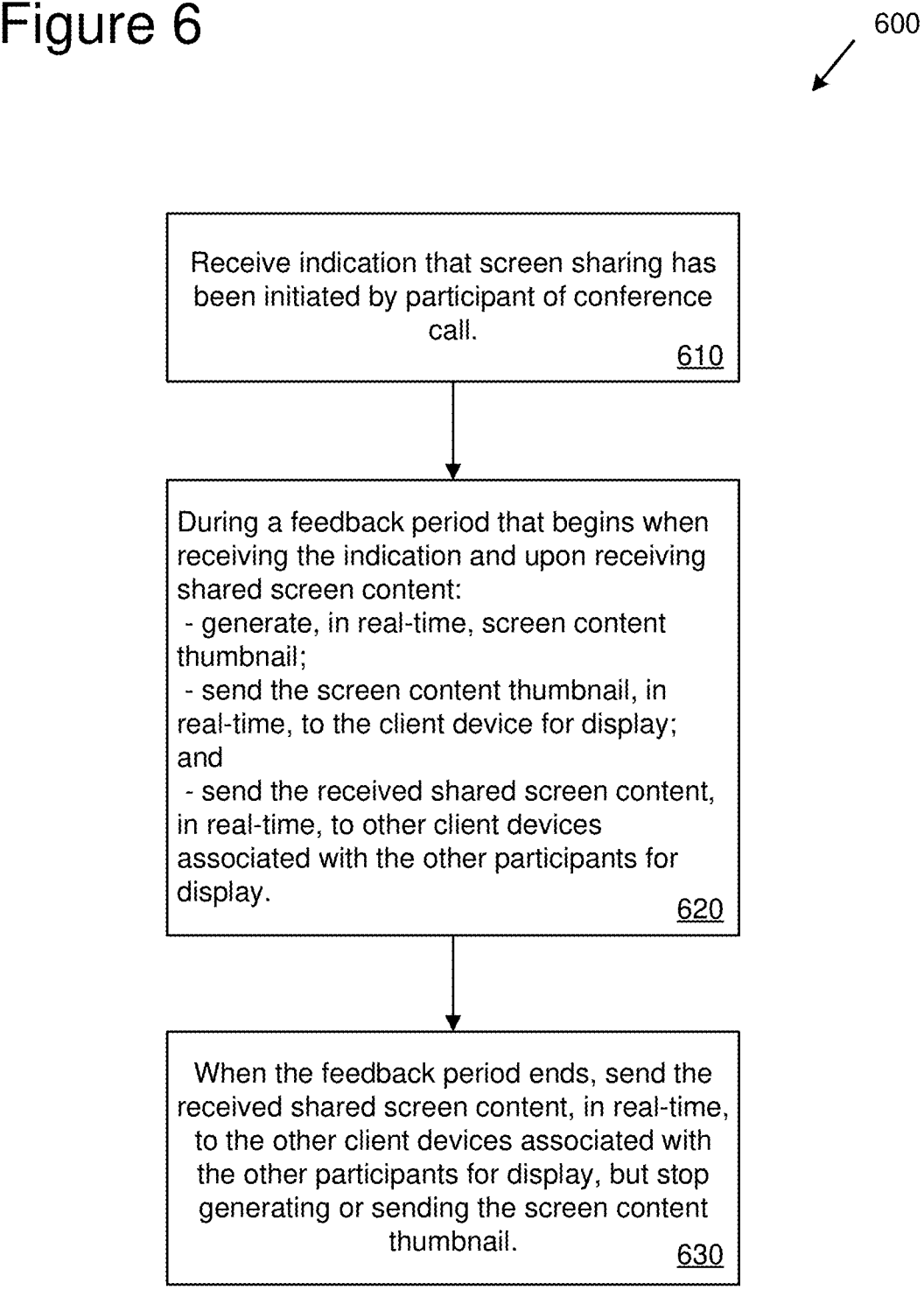
FIG. 6 is a flowchart of an example method for providing real-time feedback during a conference call in response to screen sharing.

FIG. 6 is a is a flowchart of an example method 600 for providing real-time feedback during a conference call in response to screen sharing. For example, the example method 600 can be performed by a conference call service, such as conference call service 110. At 610, an indication is received, from a client device, that screen sharing has been initiated by a participant of the conference call. The conference call includes the participant and one or more other participants.

At 620, a number of operations are performed during a feedback period that begins when receiving the indication that screen sharing has been initiated and upon receiving shared screen content from the computing device. The operations including generating, in real-time, a screen content thumbnail from the received shared screen content. The operations also include sending the screen content thumbnail, in real-time as it is being generated, to the client device for display to the participant. The operations also include sending the received shared screen content, in real-time as it is being received, to one or more other client devices associated with the one or more other participants for display.

At 630, when the feedback period ends, the received shared screen content is still sent, in real-time as it is being received, to the one or more other client devices associated with the one or more other participants for display. However, after the feedback period ends, the screen content thumbnail is no longer generated or sent to the client device for display to the participant.

Additional Examples

Example 1 is a computing device comprising: a processor; a network interface; and memory; the computing device configured to perform operations for providing real-time feedback during a conference call, the operations comprising: receiving, from a client device, an indication that a participant of the conference call has unmuted the participant's microphone, wherein the conference call includes the participant and one or more other participants; receiving incoming audio from the participant's microphone; during a feedback period triggered by the indication that the participant's microphone has been unmuted: sending the received incoming audio, in real-time as it is being received, to the client device for playback to the participant and to one or more other client devices associated with the one or more other participants for playback; and when the feedback period ends: sending the received incoming audio, in real-time as it is being received, to the one or more other client devices associated with the one or more other participants for playback; wherein the received incoming audio from the participant's microphone is not sent to the computing device for playback to the participant after the feedback period ends.

Example 2 includes the subject matter of Example 1, and further specifies that the incoming audio from the participant's microphone is sent to the client device for playback to the participant automatically during the feedback period, and without intervention by the participant, based on the indication that the participant has been unmuted.

Example 3 includes the subject matter of any of Examples 1-2, and further specifies that the computing device operates a conference call service that performs the operations for managing the conference call.

Example 4 includes the subject matter of any of Examples 1-3, and further specifies that the operations further comprise: determining an audio level of the incoming audio from the participant's microphone; and sending, to the client device, an indication of the determined audio level.

Example 5 includes the subject matter of Example 4, and further specifies that sending the indication of the determined audio level is performed only during the feedback period.

Example 6 includes the subject matter of any of Examples 4-5, and further specifies that the indication of the determined audio level is for display to the participant in a graphical user interface.

Example 7 includes the subject matter of any of Examples 1-6, and further specifies that the operations further comprise: maintaining an audience list indicating which participants of the conference call are to receive microphone audio; wherein, during the feedback period, the participant is added to the audience list; and wherein, when the feedback period ends, the participant is removed from the audience list.

Example 8 includes the subject matter of any of Examples 1-7, and further specifies that the operations further comprise: receiving, from the client device, an indication that screen sharing has been initiated; during a second feedback period that beings when receiving the indication that screen sharing has been initiated and upon receiving shared screen content from the client device: generating, in real-time, a screen content thumbnail of the received shared screen content; sending the screen content thumbnail, in real-time as it is being generated, to the client device for display to the participant; and sending the received shared screen content, in real-time as it is being received, to the one or more other client devices associated with the one or more other participants for display; and when the second feedback period ends: sending the received shared screen content, in real-time as it is being received, to the one or more other client devices associated with the one or more other participants for display; wherein the screen content thumbnail is not generated or sent to the computing device for display to the participant after the second feedback period ends.

Example 9 is a method, implemented by a computing device, for providing real-time feedback during a conference call, the method comprising: receiving, from a client device, an indication that a microphone associated with a participant of the conference call has been unmuted, wherein the conference call includes the participant and one or more other participants; during a feedback period that begins when receiving the indication and upon receiving incoming audio from the participant's microphone: sending the received incoming audio, in real-time as it is being received, to the client device for playback to the participant and to one or more other client devices associated with the one or more other participants for playback; and when the feedback period ends: sending the received incoming audio, in real-time as it is being received, to the one or more other client devices associated with the one or more other participants for playback; wherein the received incoming audio from the participant's microphone is not sent to the computing device for playback to the participant after the feedback period ends.

Example 10 includes the subject matter of Example 9, and further specifies that the incoming audio from the participant's microphone is sent to the client device for playback to the participant automatically during the feedback period, and without intervention by the participant, based on the indication that the participant has been unmuted.

Example 11 includes the subject matter of any of Examples 9-10, and further specifies that the computing device operates a conference call service that performs the operations for managing the conference call.

Example 12 includes the subject matter of any of Examples 9-11, and further specifies that the method further comprises: determining an audio level of the incoming audio from the participant's microphone; and sending, to the client device, an indication of the determined audio level.

Example 13 includes the subject matter of Example 12, and further specifies that sending the indication of the determined audio level is performed only during the feedback period.

Example 14 includes the subject matter of any of Examples 12-13, and further specifies that the indication of the determined audio level is for display to the participant in a graphical user interface.

Example 15 includes the subject matter of any of Examples 9-14, and further specifies that the method further comprises: maintaining an audience list indicating which participants of the conference call are to receive microphone audio; wherein, during the feedback period, the participant is added to the audience list; and wherein, when the feedback period ends, the participant is removed from the audience list.

Example 16 includes the subject matter of any of Examples 9-15, and further specifies that the method further comprises: receiving, from the client device, an indication that screen sharing has been initiated; during a second feedback period that beings when receiving the indication that screen sharing has been initiated and upon receiving shared screen content from the client device: generating, in real-time, a screen content thumbnail of the received shared screen content; sending the screen content thumbnail, in real-time as it is being generated, to the client device for display to the participant; and sending the received shared screen content, in real-time as it is being received, to the one or more other client devices associated with the one or more other participants for display; when the second feedback period ends: sending the received shared screen content, in real-time as it is being received, to the one or more other client devices associated with the one or more other participants for display; wherein the screen content thumbnail is not generated or sent to the computing device for display to the participant after the second feedback period ends.

Example 17 includes the subject matter of any of Examples 1-16, and further specifies that the indication that the microphone associated with the participant has been unmuted is received responsive to the participant selecting an unmute button in a graphical user interface of a conference call client running at the client device.

Example 18 is one or more computer-readable storage media storing computer-executable instructions for execution on a computing device to perform operations providing real-time feedback during a conference call, the operations comprising: receiving, from a client device, an indication that screen sharing has been initiated by a participant of the conference call, wherein the conference call includes the participant and one or more other participants; during a feedback period that begins when receiving the indication and upon receiving shared screen content from the client device: generating, in real-time, a screen content thumbnail of the received shared screen content; sending the screen content thumbnail, in real-time as it is being generated, to the client device for display to the participant; and sending the received shared screen content, in real-time as it is being received, to one or more other client devices associated with the one or more other participants for display; and when the feedback period ends: sending the received shared screen content, in real-time as it is being received, to the one or more other client devices associated with the one or more other participants for display; wherein the screen content thumbnail is not generated or sent to the computing device for display to the participant after the feedback period ends.

Example 19 includes the subject matter of any of Examples 8, 16, or 18, and further specifies that the screen content thumbnail is generated and sent to the client device for display to the participant automatically, and without intervention by the participant, based on the indication that screen sharing has been initiated by the participant.

Example 20 includes the subject matter of any of Examples 18-19, and further specifies that the computing device operates a conference call service that performs the operations for managing the conference call.

Computing Systems

Figure 7:
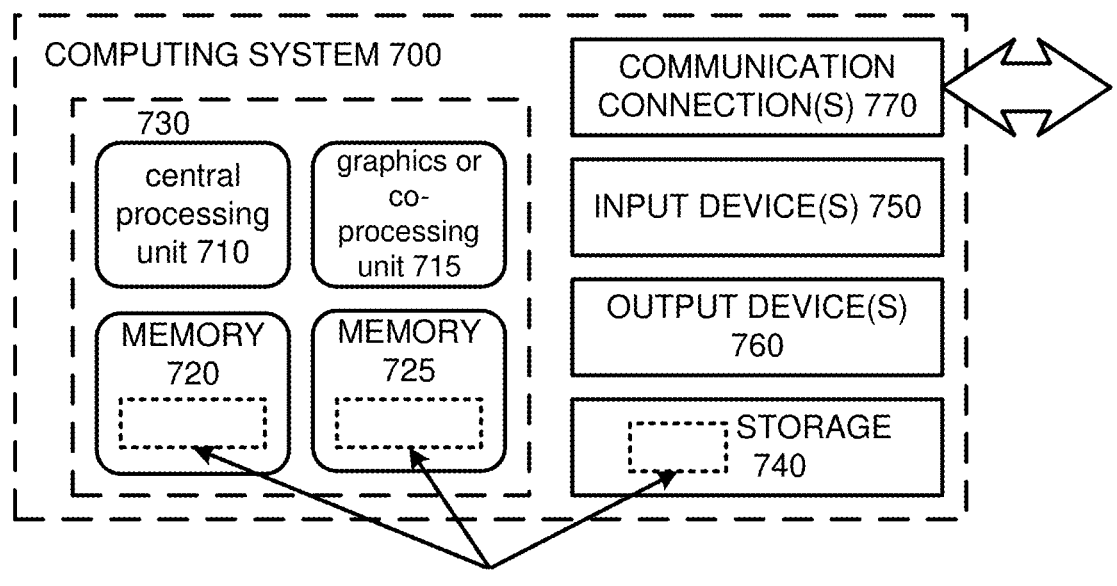
FIG. 7 is a diagram of an example computing system in which some described embodiments can be implemented.

FIG. 7 depicts a generalized example of a suitable computing system 700 in which the described technologies may be implemented. The computing system 700 is not intended to suggest any limitation as to scope of use or functionality, as the technologies may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more technologies described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more technologies described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud-Supported Environment

Figure 8:
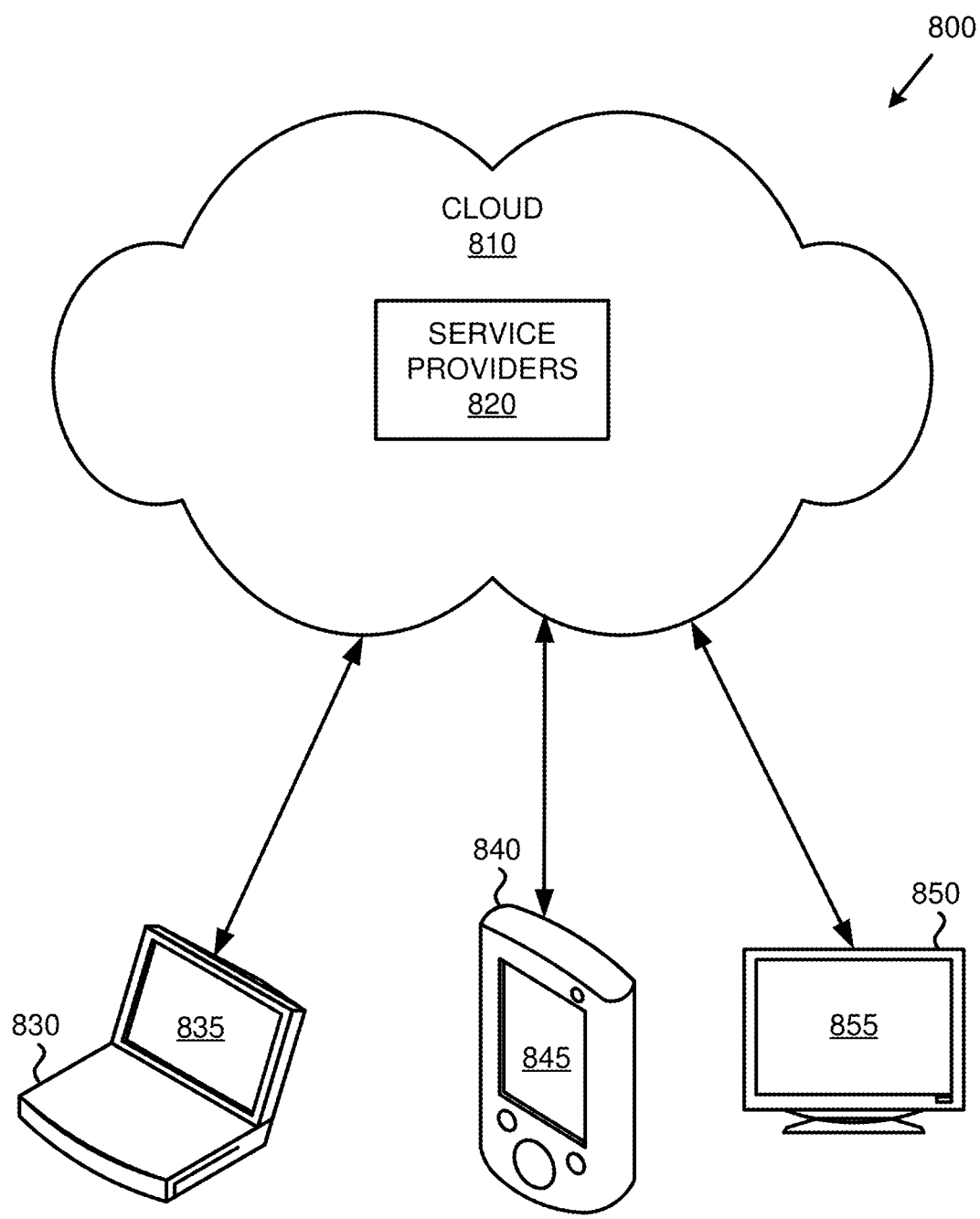
FIG. 8 is an example cloud-support environment that can be used in conjunction with the technologies described herein.

FIG. 8 illustrates a generalized example of a suitable cloud-supported environment 800 in which described embodiments, techniques, and technologies may be implemented. In the example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touchscreen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections, such as 770.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
a processor;
a network interface; and
memory;
the computing device configured to perform operations for providing real-time feedback during a conference call, the operations comprising:
receiving, from a client device, an indication that a participant of the conference call has unmuted the participant's microphone, wherein the conference call includes the participant and one or more other participants;
receiving incoming audio from the participant's microphone;
during a feedback period triggered by the indication that the participant's microphone has been unmuted:
sending the received incoming audio, in real-time as it is being received, to the client device for playback to the participant and to one or more other client devices associated with the one or more other participants for playback; and
when the feedback period ends:
sending the received incoming audio, in real-time as it is being received, to the one or more other client devices associated with the one or more other participants for playback;
wherein the received incoming audio from the participant's microphone is not sent to the computing device for playback to the participant after the feedback period ends.

2. The computing device of claim 1, wherein the incoming audio from the participant's microphone is sent to the client device for playback to the participant automatically during the feedback period, and without intervention by the participant, based on the indication that the participant has been unmuted.

3. The computing device of claim 1, wherein the computing device operates a conference call service that performs the operations for providing real-time feedback during the conference call.

4. The computing device of claim 1, the operations further comprising:
determining an audio level of the incoming audio from the participant's microphone; and
sending, to the client device, an indication of the determined audio level.

5. The computing device of claim 4, wherein sending the indication of the determined audio level is performed only during the feedback period.

6. The computing device of claim 4, wherein the indication of the determined audio level is for display to the participant in a graphical user interface.

7. The computing device of claim 1, the operations further comprising:
maintaining an audience list indicating which participants of the conference call are to receive microphone audio;
wherein, during the feedback period, the participant is added to the audience list; and
wherein, when the feedback period ends, the participant is removed from the audience list.

8. The computing device of claim 1, the operations further comprising:
receiving, from the client device, an indication that screen sharing has been initiated;
during a second feedback period that begins when receiving the indication that screen sharing has been initiated and upon receiving shared screen content from the client device:
generating, in real-time, a screen content thumbnail of the received shared screen content;
sending the screen content thumbnail, in real-time as it is being generated, to the client device for display to the participant; and
sending the received shared screen content, in real-time as it is being received, to the one or more other client devices associated with the one or more other participants for display; and
when the second feedback period ends:
sending the received shared screen content, in real-time as it is being received, to the one or more other client devices associated with the one or more other participants for display;
wherein the screen content thumbnail is not generated or sent to the computing device for display to the participant after the second feedback period ends.

9. A method, implemented by a computing device, for providing real-time feedback during a conference call, the method comprising:
receiving, from a client device, an indication that a microphone associated with a participant of the conference call has been unmuted, wherein the conference call includes the participant and one or more other participants;
during a feedback period that begins when receiving the indication and upon receiving incoming audio from the participant's microphone:
sending the received incoming audio, in real-time as it is being received, to the client device for playback to the participant and to one or more other client devices associated with the one or more other participants for playback; and
when the feedback period ends:
sending the received incoming audio, in real-time as it is being received, to the one or more other client devices associated with the one or more other participants for playback;
wherein the received incoming audio from the participant's microphone is not sent to the computing device for playback to the participant after the feedback period ends.

10. The method of claim 9, wherein the incoming audio from the participant's microphone is sent to the client device for playback to the participant automatically during the feedback period, and without intervention by the participant, based on the indication that the participant has been unmuted.

11. The method of claim 9, wherein the computing device operates a conference call service that performs the operations for providing real-time feedback during the conference call.

12. The method of claim 9, further comprising:
determining an audio level of the incoming audio from the participant's microphone; and
sending, to the client device, an indication of the determined audio level.

13. The method of claim 12, wherein sending the indication of the determined audio level is performed only during the feedback period.

14. The method of claim 12, wherein the indication of the determined audio level is for display to the participant in a graphical user interface.

15. The method of claim 9, further comprising:
maintaining an audience list indicating which participants of the conference call are to receive microphone audio;
wherein, during the feedback period, the participant is added to the audience list; and
wherein, when the feedback period ends, the participant is removed from the audience list.

16. The method of claim 9, further comprising:
receiving, from the client device, an indication that screen sharing has been initiated;
during a second feedback period that begins when receiving the indication that screen sharing has been initiated and upon receiving shared screen content from the client device:
generating, in real-time, a screen content thumbnail of the received shared screen content;
sending the screen content thumbnail, in real-time as it is being generated, to the client device for display to the participant; and
sending the received shared screen content, in real-time as it is being received, to the one or more other client devices associated with the one or more other participants for display; and
when the second feedback period ends:
sending the received shared screen content, in real-time as it is being received, to the one or more other client devices associated with the one or more other participants for display;
wherein the screen content thumbnail is not generated or sent to the computing device for display to the participant after the second feedback period ends.

17. The method of claim 9, wherein the indication that the microphone associated with the participant has been unmuted is received responsive to the participant selecting an unmute button in a graphical user interface of a conference call client running at the client device.

18. One or more computer-readable storage media storing computer-executable instructions for execution on a computing device to perform operations providing real-time feedback during a conference call, the operations comprising:
receiving, from a client device, an indication that screen sharing has been initiated by a participant of the conference call, wherein the conference call includes the participant and one or more other participants;
during a feedback period that begins when receiving the indication and upon receiving shared screen content from the client device:
generating, in real-time, a screen content thumbnail of the received shared screen content;
sending the screen content thumbnail, in real-time as it is being generated, to the client device for display to the participant; and
sending the received shared screen content, in real-time as it is being received, to one or more other client devices associated with the one or more other participants for display; and
when the feedback period ends:
sending the received shared screen content, in real-time as it is being received, to the one or more other client devices associated with the one or more other participants for display;
wherein the screen content thumbnail is not generated or sent to the computing device for display to the participant after the feedback period ends.

19. The one or more computer-readable storage media of claim 18, wherein the screen content thumbnail is generated and sent to the client device for display to the participant automatically during the feedback period, and without intervention by the participant, based on the indication that screen sharing has been initiated by the participant.

20. The one or more computer-readable storage media of claim 18, wherein the computing device operates a conference call service that performs the operations for providing real-time feedback during the conference call.

* * * * *